US011878904B2

(12) United States Patent
Prevete et al.

(10) Patent No.: US 11,878,904 B2
(45) Date of Patent: Jan. 23, 2024

(54) WINDSHIELD WASHER FLUID DISPENSING SELF SERVICE STATION

(71) Applicants: Domenico Prevete, Doral, FL (US); Carlos Martin, Hollywood, FL (US)

(72) Inventors: Domenico Prevete, Doral, FL (US); Carlos Martin, Hollywood, FL (US)

( * ) Notice: Subject to any disclaimer, the term of this patent is extended or adjusted under 35 U.S.C. 154(b) by 0 days.

(21) Appl. No.: 17/993,738

(22) Filed: Nov. 23, 2022

(65) Prior Publication Data

US 2023/0159319 A1 May 25, 2023

Related U.S. Application Data

(60) Provisional application No. 63/282,302, filed on Nov. 23, 2021.

(51) Int. Cl.

*B67D 7/84* (2010.01)
*B67D 7/02* (2010.01)
*B67D 7/74* (2010.01)
*B67D 7/22* (2010.01)

(52) U.S. Cl.

CPC ................. *B67D 7/84* (2013.01); *B67D 7/02* (2013.01); *B67D 7/222* (2013.01); *B67D 7/744* (2013.01)

(58) Field of Classification Search

CPC . B67D 7/84; B67D 7/02; B67D 7/222; B67D 7/744

See application file for complete search history.

(56) References Cited

U.S. PATENT DOCUMENTS

| | | | |
|---|---|---|---|
| 6,910,509 B1 | 6/2005 | Wheeler | |
| 2002/0130142 A1 | 9/2002 | Wheeler | |
| 2009/0090742 A1* | 4/2009 | Yacko | B67D 7/344 141/192 |
| 2010/0024915 A1* | 2/2010 | Thomas | A47L 13/50 141/69 |
| 2010/0258587 A1 | 10/2010 | Wheeler | |

FOREIGN PATENT DOCUMENTS

WO WO2000071464 A1 11/2000

* cited by examiner

*Primary Examiner* — Jason K Niesz

(57) ABSTRACT

The windshield washer fluid dispenser is a self-service station, that is capable of providing a user with high quality windshield washer fluid and the ability to utilize the windshield washer fluid manually. To accomplish this, the device includes a combination of components, that allows one to properly clean the windshield on one's vehicle without the need of an attendant. To accomplish this, the system includes a body, that houses a user-friendly dispenser container, a blend center unit that can instantaneously mix liquids to make a windshield washer solution, and a HID (human interface device) that can dispense the windshield washer solution according to users' needs. Further, the system includes a display device, a payment system, a sign board and necessary accessories that help with the smooth functioning of the system. Thus, the device utilizes simple, user-interactive, and cost-effective technologies to provide the windshield washer fluid dispenser self service station.

20 Claims, 9 Drawing Sheets

WINDSHIELD WASHER FLUID DISPENSING SELF SERVICE STATION

FIELD OF THE INVENTION

The present invention relates generally to vehicle servicing tools. More specifically, the present invention is a windshield washer fluid dispensing self service station for the upkeep and cleaning of vehicle windshields.

BACKGROUND OF THE INVENTION

While driving in a vehicle, the windshield of the vehicle prevents the driver from being affected by the wind, wildlife, or debris that may otherwise collide with the driver. Because of the purpose the windshield serves, the windshield is frequently covered with dirt or grime from the road, insects struck by the windshield, or other debris. This debris can lead to difficulty seeing through the windshield and concurrently danger while driving. As vehicles have become more and more advanced over the years, windshield wipers and windshield washer fluid dispensers were added. These additions made it possible to clean the windshield of the vehicle at any time while the vehicle is being operated. The windshield wipers of vehicles are effective but are only capable of cleaning a specific area of the windshield. Additionally, the windshield wipers follow a specific pattern which may make it difficult to clean specific areas of the windshield. Windshield washer fluid and tools for cleaning windshields are often available at select gas stations. However, typically the fluid is held within a bucket and may be of low quality. Alternatively, the particular gas station may charge money for the application of fresh, higher quality windshield washer fluid and provision of said fluid by an attendant.

It is an objective of the present invention to offer a solution to the issues mentioned above. The present invention is a windshield washer fluid dispensing self service station. The present invention attempts to provide a system for applying high quality windshield washer fluid to a vehicle's windshield. To accomplish this, the present invention comprises components and utilizes technologies to provide a self-service system that enables users to properly clean the windshield on one's vehicle without the need of an attendant. In other words, the present invention provides a system that is capable of providing a user with high quality windshield washer fluid and the ability to utilize the windshield washer fluid manually.

SUMMARY OF THE INVENTION

The present invention is a windshield washer fluid dispenser self service station. The combination of components involved in the present invention allows one to properly clean the windshield on one's vehicle without the need of an attendant. The present invention provides a system that is capable of providing a user with high quality windshield washer fluid and the ability to utilize the windshield washer fluid manually. To accomplish this, the system includes a body, that houses a user-friendly dispenser container, a blend center unit that can instantaneously mix liquids to make a windshield washer solution, and a HID (human interface device) that can dispense the windshield washer solution according to users' needs. Further, the system includes a display device, a payment system, a sign board and necessary accessories that help with the smooth functioning of the system. Thus, the device utilizes simple, user-interactive, and cost-effective technologies to provide the windshield washer fluid dispenser self service station.

DETAILED DESCRIPTION OF THE INVENTION

All illustrations of the drawings are for the purpose of describing selected versions of the present invention and are not intended to limit the scope of the present invention.

In reference to FIG. 1 through FIG. 9 the present invention is a windshield washer fluid dispenser self service station. The combination of components involved in the present invention allows one to properly clean the windshield on one's vehicle without the need of an attendant. The present invention provides a system that is capable of providing a user with high quality windshield washer fluid and the ability to utilize the windshield washer fluid manually. Further, the present invention utilizes simple, user-interactive, and cost-effective technologies to provide the windshield washer fluid dispenser self service station.

Figure 1:
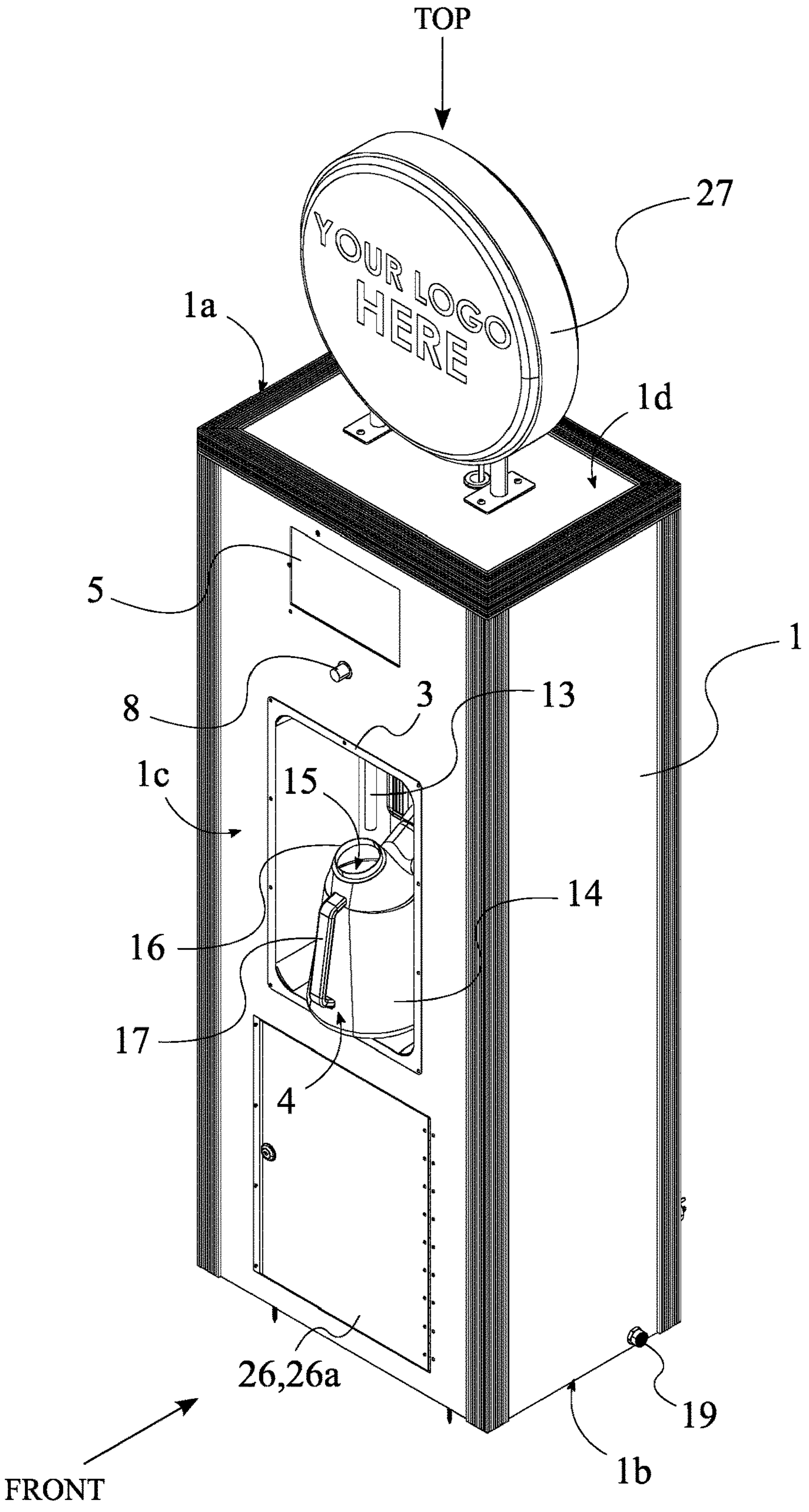
FIG. 1 is a top front right perspective view of the present invention.

The following description is in reference to FIG. 1 through FIG. 9. According to a preferred embodiment, the present invention comprises a receptacle 1, a cavity 2, a dispenser container enclosure compartment 3, a dispenser container 4, a display device 5, a user detecting device 6, a microcontroller 7, an HID (human interface device) 8, and a blend center unit 9. As seen in FIG. 1, the receptacle 1 is a rectangular box that acts as a protective outer covering and main body of the present invention. Accordingly, the receptacle 1 is made of a plurality of rectangular panels that are made of a sturdy solid material such as metal and arranged in such a way to form the rectangular box or body. Preferably, the receptacle 1 is composed of proprietary anodized aluminum extrusion assembled into the shape of a vertical rectangular prism as shown in FIG. 1. In the preferred embodiment, the plurality of panels consists of three-millimeter ACM panels. However, the receptacle 1 may comprise any other material, shape, components, and arrangement of components that are known to one of ordinary skill in the art, as long as the intents of the present invention are not altered.

According to the preferred embodiment, the plurality of panels encloses an internal portion or cavity 2 of the present invention. To that end, the cavity 2 traverses through the receptacle 1, wherein the cavity 2 extends from a first end 1*a* of the receptacle 1 through a second end 1*b* of the receptacle 1. Preferably, the first end 1*a* constitutes a top end of the receptacle 1, and the second end 1*b* constitutes a bottom end 1*b* of the receptacle 1. Thus, the first end 1*a* is positioned opposite to the second end 1*b* across the receptacle 1.

Figure 2:
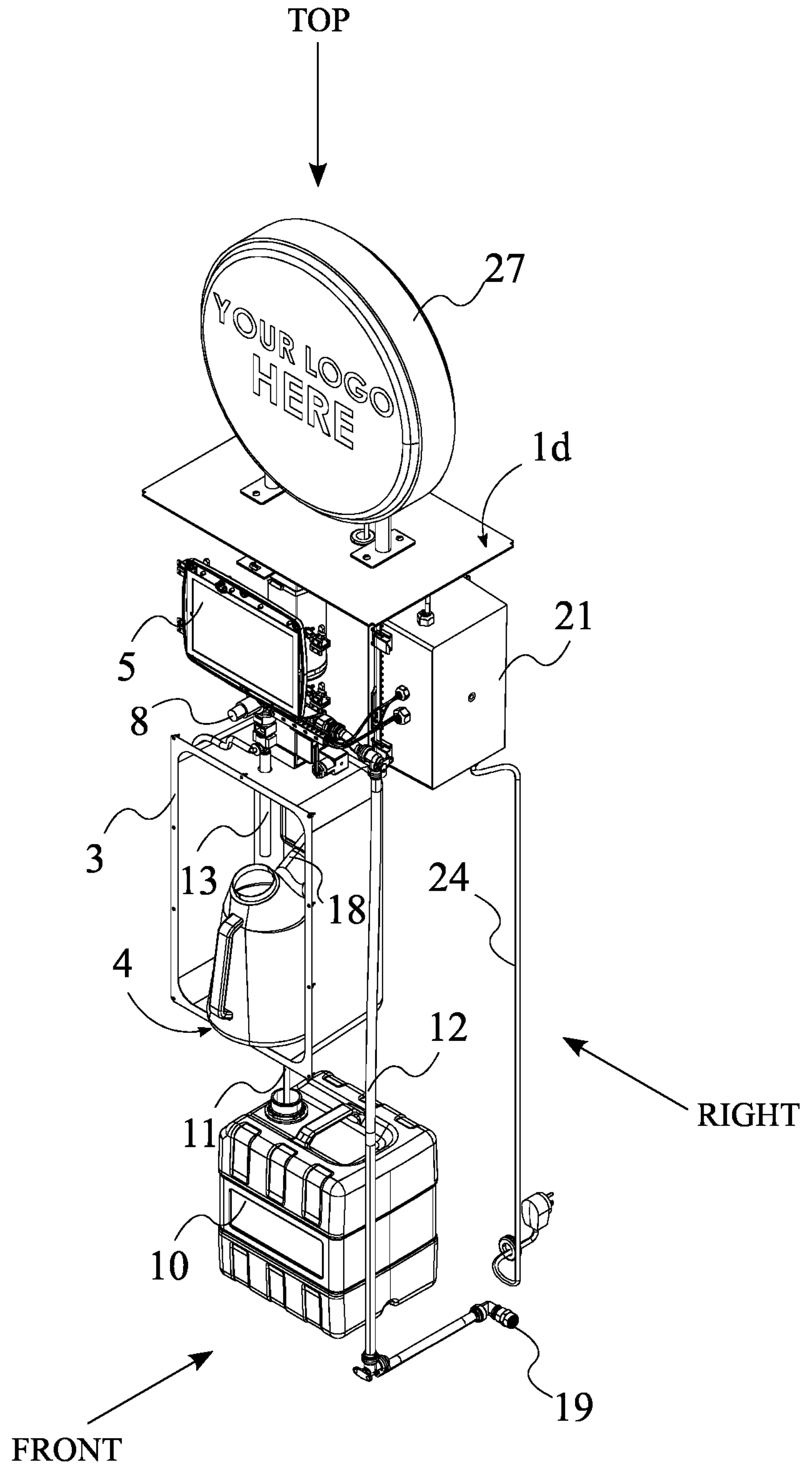
FIG. 2 is a top front right perspective view of the present invention shown without the outer protective cover, to reveal the inner components.
Figure 3:
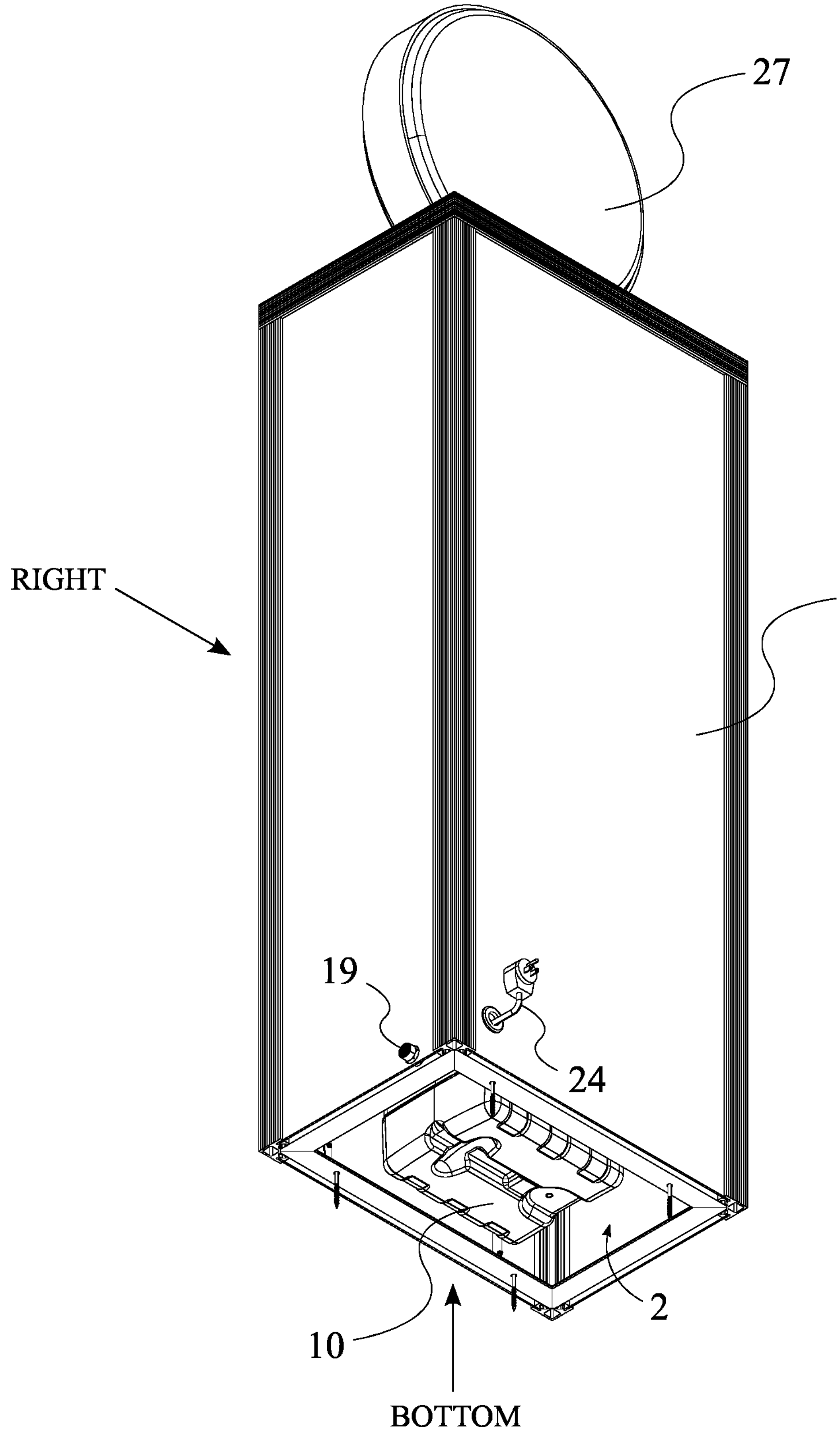
FIG. 3 is a bottom rear right perspective view of the present invention.

As seen in FIG. 1, FIG. 2, and FIG. 3, the dispenser container enclosure compartment 3 is laterally integrated onto a first surface 1*c* of the receptacle 1, in such a way that the dispenser container enclosure compartment 3 extends into the cavity 2. In the preferred embodiment, the first surface 1*c* constitutes a front surface of the receptacle 1. In other words, the dispenser container enclosure compartment 3 is a rectangular indent in the front surface of the body as shown in FIG. 1. This is so that, the dispenser container 4 may be detachably positioned within the dispenser container enclosure compartment 3.

Additionally, residing on the front surface of the body is the display device 5. In other words, the display device 5 is laterally integrated onto the first surface 1*c* of the receptacle 1. The display device 5 is an electronic component capable of displaying advertisements. Preferably, the display device 5 is a tablet run by the Android operating system. Further, the user detecting device 6 is preferably a camera that is integrated into the display device 5. In another embodiment, the user detecting device 6 may be at least one wireless sensor, that can detect the presence of a user through motion sensing, face recognition, blue tooth activation, voice activation etc. However, the display device 5 and the user detecting device 6 may comprise any other brand, size, shape, technology, components, arrangement of components etc. that are known to one of ordinary skill in the art, as long as the intents of the present invention are not altered. To enable smooth functioning, the display device 5 and the user detecting device 6 are electronically coupled to the microcontroller 7. This is so that, when the user detecting device 6 detects the presence of a user, a signal is sent to the display device 5 through the microcontroller 7 and the display device 5 turns active. In other words, the display device 5 is operably coupled to the user detecting device 6, wherein the display device 5 is actuated by the user detecting device 6. To that end, the microcontroller 7 is a processing device that manages the operation of the electrical components within the present invention. The microcontroller 7 is an integrated circuit that may comprise any brand, size, components, arrangement of components etc. that are known to one of ordinary skill in the art, as long as the intents of the present invention are not altered.

Figure 8:
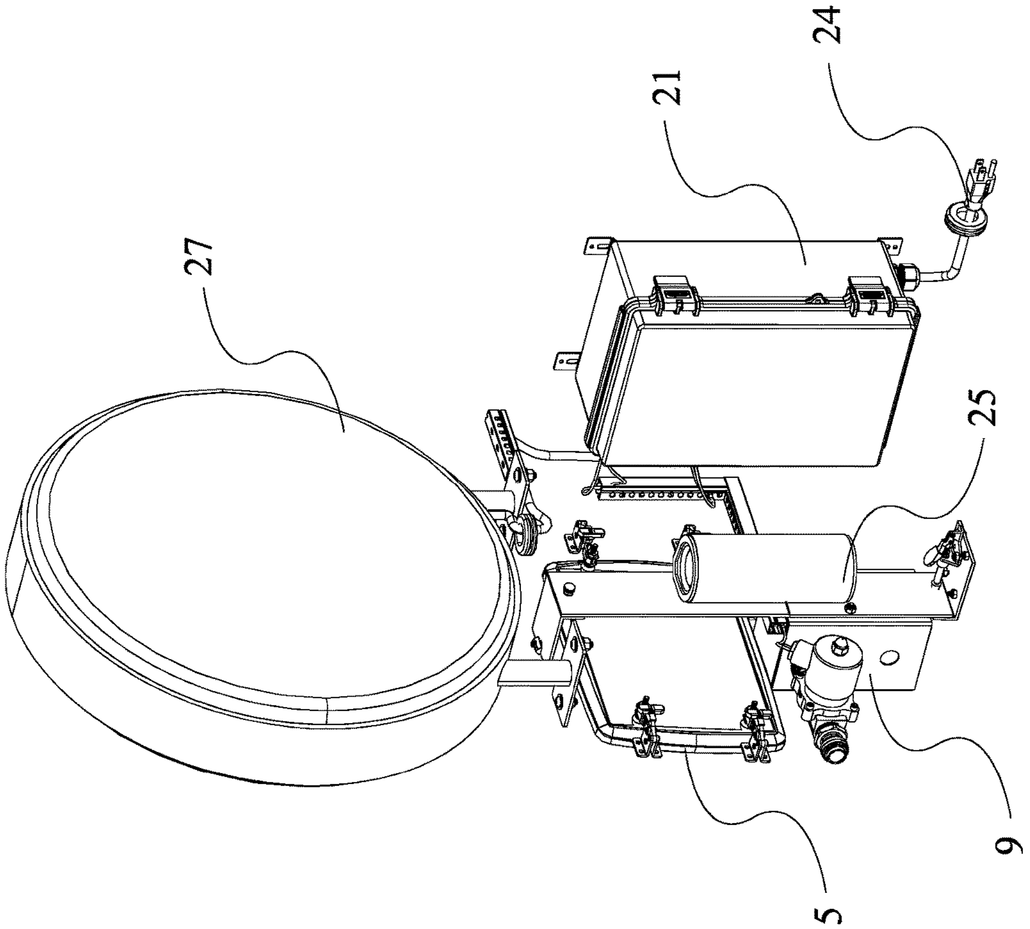
FIG. 8 is a rear perspective view of the electrical and electronic components of the present invention.
Figure 9:
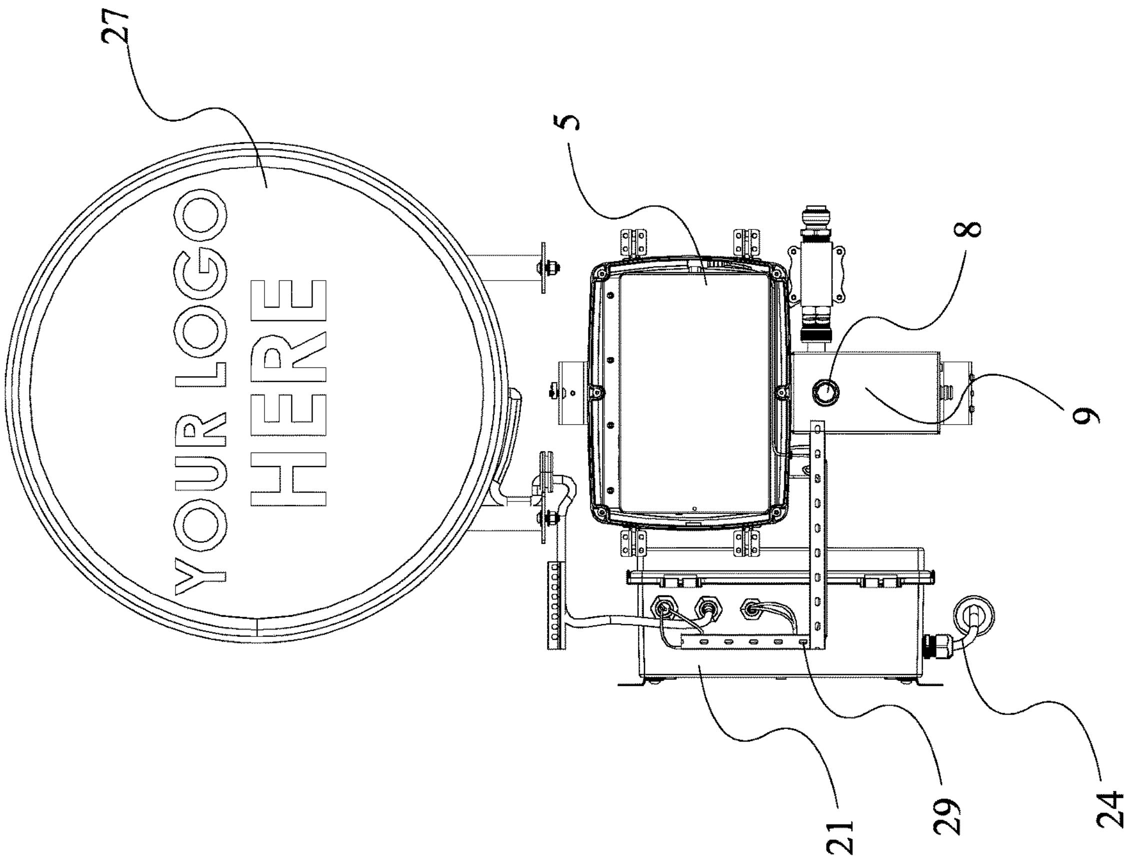
FIG. 9 is a front view of the electrical and electronic components of the present invention.

The HID 8 is, in the preferred embodiment, a small circular component accessible via the front surface of the body of the present invention. In other words, the HID 8 is laterally integrated onto the front surface of the receptacle 1 and is a circular button. The HID 8 is a part of the blend center unit 9, and accordingly the blend center unit 9 is mounted adjacent to the HID 8. As seen in FIG. 8 and FIG. 9, the blend center unit 9 resides within the cavity 2 and is primarily a rectangular prism in shape. According to the preferred embodiment, the HID 8 is operably coupled to the blend center unit 9, wherein operating the HID 8 governs dispensing of a windshield washer solution from the blend center unit into the dispenser container. In other words, the windshield washer solution located at the blend center unit 9 will be dispensed into the dispenser container 4 when the user operates the HID 8 or pushes the circular button. On releasing the HID 8, dispensing of the windshield washer solution stops. To enable this, on the paid version units only, a solenoid valve is integrated onto the HID 8. However, the HID 8 may have any other shape and technology, such as voice activation, a pulling lever etc., that are known to one of ordinary skill in the art, as long as the objectives of the present invention are fulfilled.

A more detailed description of the internal components of the present invention follows. According to the preferred embodiment, the present invention comprises a concentrate container 10, a concentrate suction tube 11, a water supply tube 12, and a mixed product dispenser tube 13. Preferably, the concentrate container 10, the concentrate suction tube 11, and the water supply tube 12 are mounted within the cavity 2. Within the body of the present invention and resting towards the bottom end of the receptacle 1 is the concentrate container 10. In other words, the concentrate container 10 is mounted adjacent to the second end 1*b* of the receptacle 1, as seen in FIG. 2 and FIG. 3. In the preferred embodiment, the concentrate container 10 is large enough to hold a sufficient amount of windshield washer fluid concentrate while being small enough to be accessed or removed through an opening or door on the receptacle 1. As seen in FIG. 2, rising vertically from the concentrate container 10 and connecting to the blend center unit 9 is the concentrate suction tube 11. The concentrate suction tube 11 is a portion of a cylindrical tubing that is in fluid communication with the concentrate container 10 and the blend center unit 9. Also connected to the blend center unit 9 is the water supply tube 12. In other words, the blend center unit 9 is in fluid communication with the concentrate suction tube 11 and the water supply tube 12. Extending downward from the blend center unit 9 to the top of the dispenser container 4 is a straight, cylindrical component referred to as the mixed product dispenser tube 13. In other words, the mixed product dispenser tube 13 extends from the blend center unit 9, and the mixed product dispenser tube 13 is oriented towards the dispenser container 4. This arrangement is so that, a specific set of functions may be performed for the smooth operation of the self-service windshield washer dispensing station. More specifically, when the HID 8 or activation button is pressed and held down to activate the blend center unit 9, the concentrate suction tube 11 draws concentrate from the concentrate container 10. This is enabled as the water from the water supply tube 12 flows through the blend center unit 9. Further, at the blend center unit 9, the concentrate mixes with the water from the water supply tube 12, by means of siphoning. Subsequently, the mixed product dispenser tube 13 releases the mixed product or the windshield washer solution into the dispenser container 4.

Figure 4:
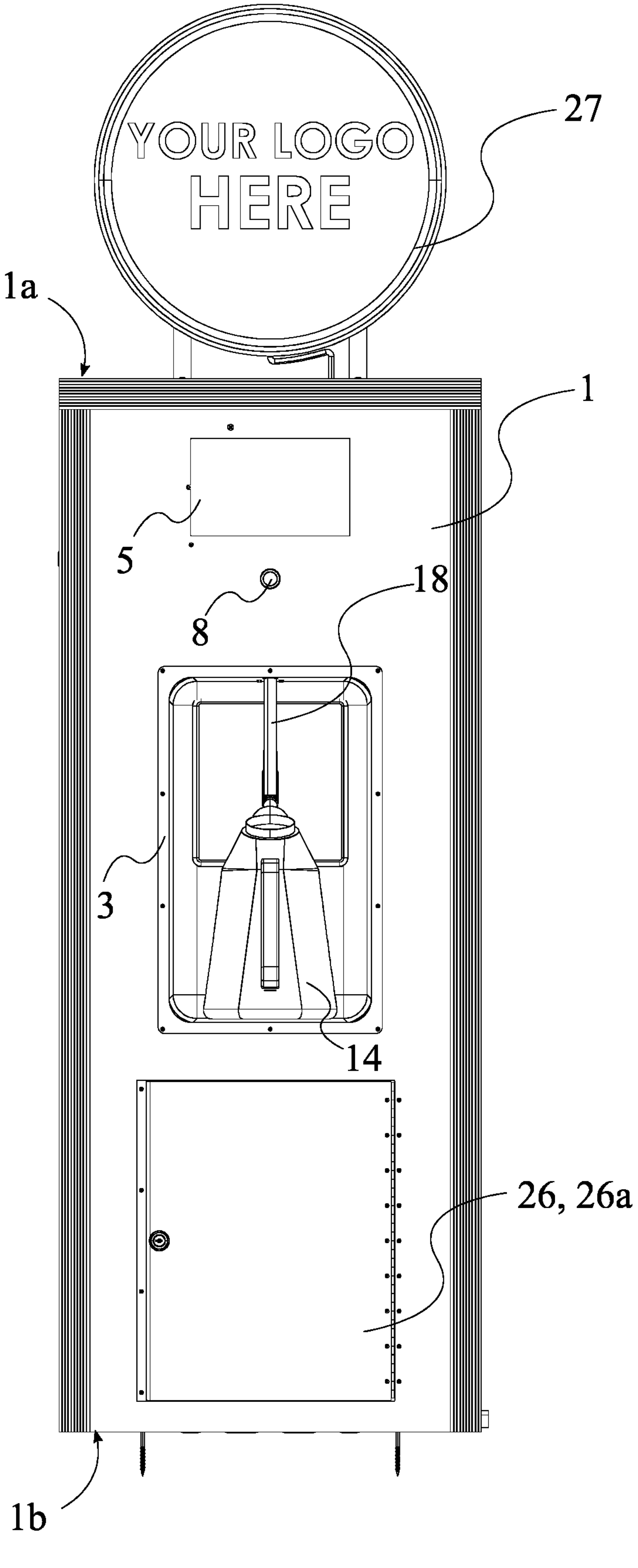
FIG. 4 is a front elevational view of the present invention.

As seen in FIG. 1 and FIG. 2 and FIG. 4, the dispenser container 4 comprises a container body 14, an internal compartment 15, a mouth 16, a handle 17, and a spout 18. In the preferred embodiment, the internal compartment 15 traverses into the container body 14. Further, the mouth 16 is oriented towards the mixed product dispenser tube 13, wherein the mouth 16 provides access into the internal compartment 15. This is so that mixed product dispenser tube 13 may release the windshield washer solution into the dispenser container 4 through the mouth 16 of the dispenser container 4 and fill the internal compartment 15 with the proper mixture. For easy handling by the user, the handle 17 is laterally mounted onto the container body 14. For pouring out the windshield washer solution onto vehicle windshields in a controlled manner, the spout 18 laterally extends from the container body 14 opposite to the handle 17, and the spout 18 is in fluid communication with the internal compartment 15.

Figure 5:
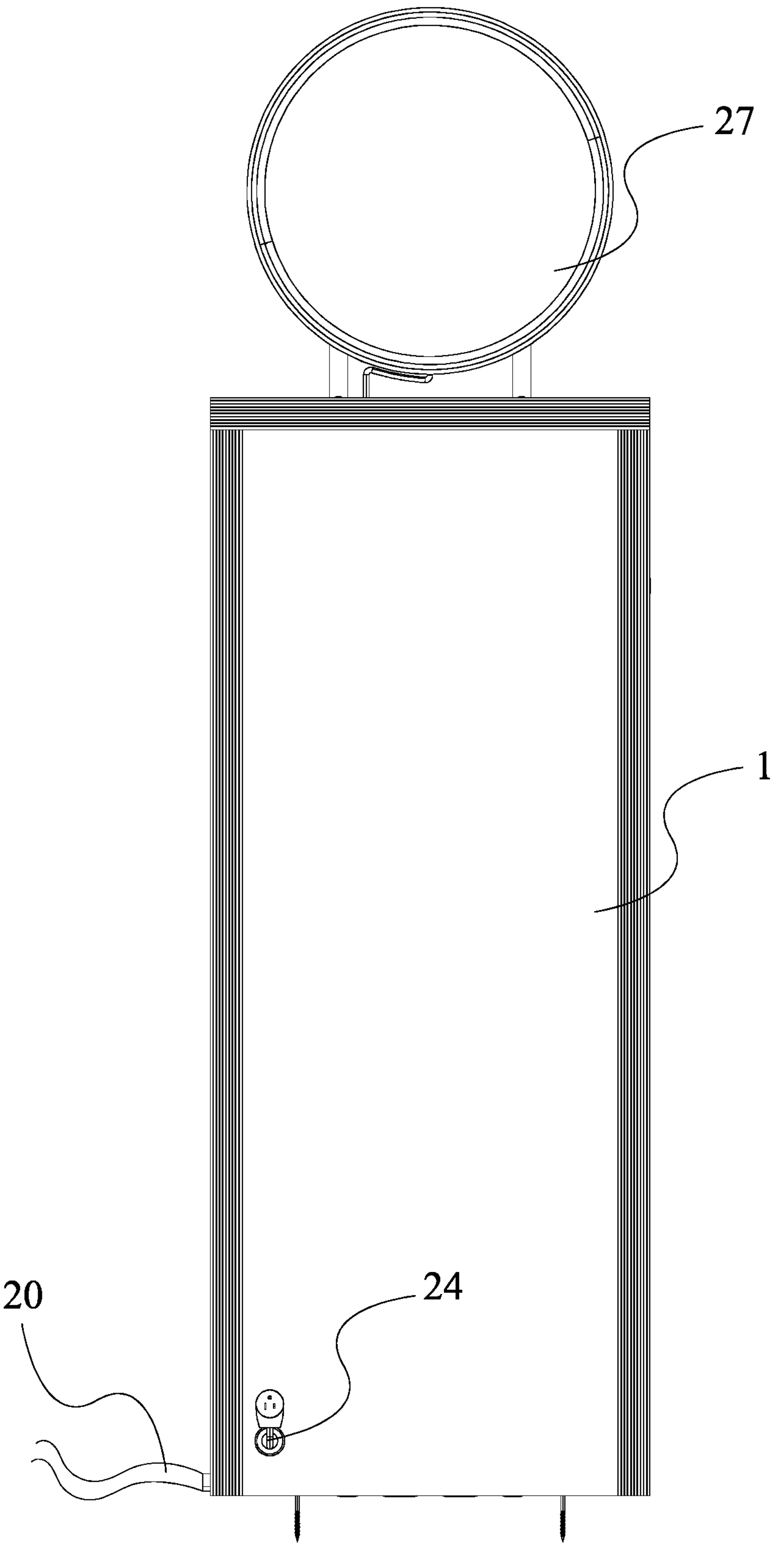
FIG. 5 is a rear elevational view of the present invention.

In order to supply water to the water supply tube 12, the water supply tube 12 is connected to a hose inlet water supply at one of the corners of the bottom of the receptacle 1, as seen in FIG. 5. To that end, the present invention comprises a water inlet valve 19, and an inlet water source 20. Preferably, the inlet water source 20 is a hose that is connected to an external source such as a tank or a tap. As seen in FIG. 2 and FIG. 3, the water inlet valve 19 traverses laterally through the receptacle 1, and the water inlet valve 19 is positioned adjacent to the second end 1*b* of the receptacle 1. Further, for smooth operation of the system, the water supply tube 12 is connected to the inlet water source 20 through the water inlet valve 19, as seen in FIG. 5.

Figure 6:
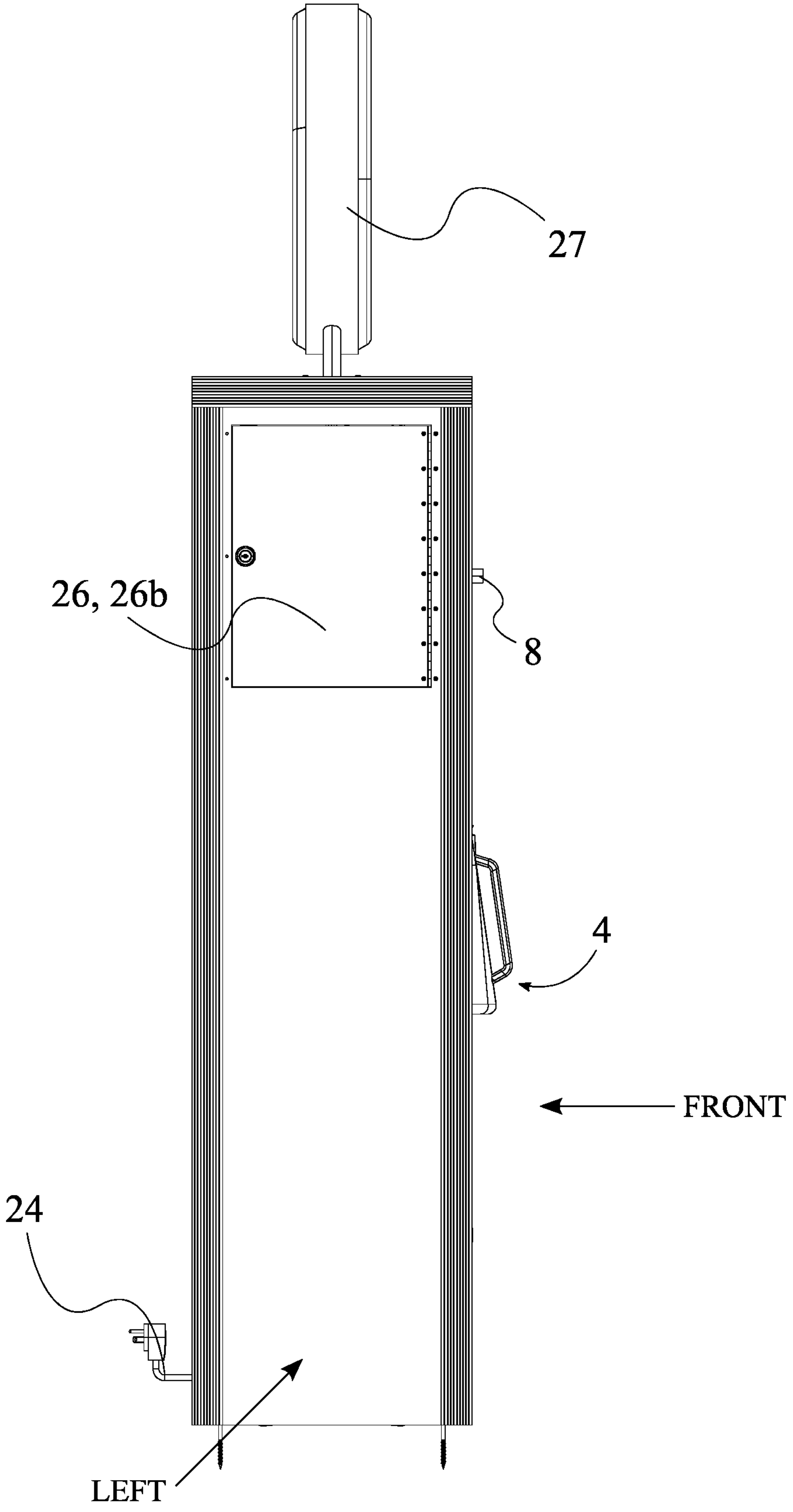
FIG. 6 is a left side elevational view of the present invention.
Figure 7:
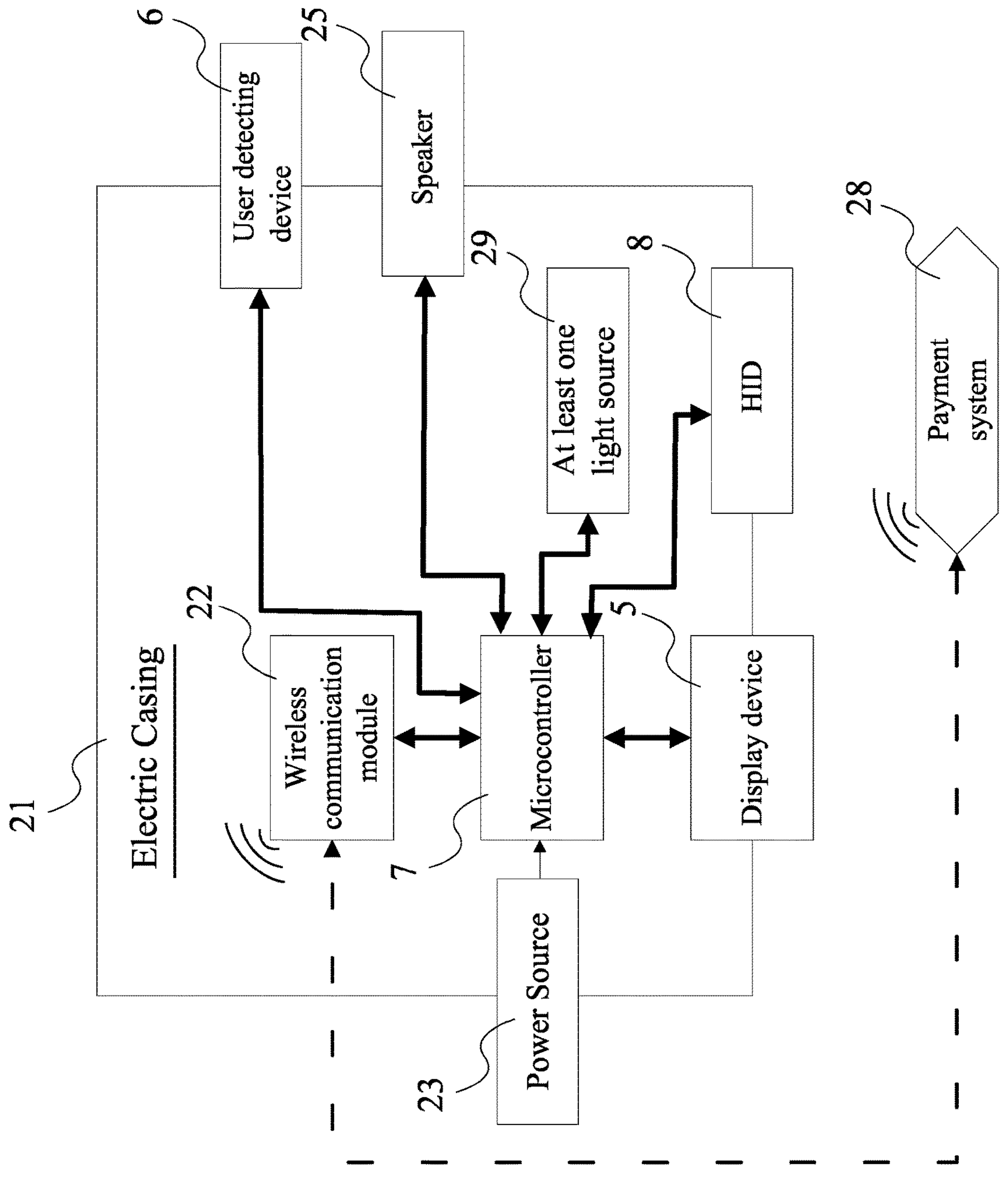
FIG. 7 is a block diagram of the electrical and electronic components of the present inventions, wherein thicker lines represent electronic connection, thinner lines represent electrical connections, and broken lines represent wireless connections.

In reference to FIG. 7 though FIG. 9, the present invention comprises an electric casing 21, a wireless communication module 22, and a power source 23. Preferably, the electric casing 21 is mounted within the cavity 2, and the microcontroller 7, the wireless communication module 22, and the power source 23 are mounted within the electric casing 21. This is so that the sensitive electrical components may be safely arranged in a secure box and protected from hazardous outside elements such as pipes dealing with liquid connections. It is an aim of the present invention to incorporate wireless activations and operations such as voice activation, blue tooth activation, face recognition etc. To that end, the wireless communication module 22 is electronically connected to the microcontroller 7. In other words, the microcontroller 7 may comprise a wireless communication module, that connects and communicates with external devices via wireless data transmission protocols. Example standards of what the wireless communication module 22 is capable of using includes, but are not limited to, Bluetooth, WI-FI, GSM, CDMA, ZigBee, etc. In order to provide electrical power to the electric components of the present invention, the power source 23 is electrically connected to the microcontroller 7. Preferably, the power source 23 is an electrical power strip with surge protection. However, any other source of power, or a combination of the following sources may be employed for the smooth functioning of the present invention. Examples of such power sources include, but are not limited to, Li ion batteries, magnetic power converters, solar power converters, etc. In the preferred embodiment, the present invention comprises an electrical terminal that allows the present invention to receive electrical power from an external power supply, and/or an electrical terminal that allows the present invention to send electrical power to an external electrical load. To that end, the present invention comprises a power cord 24, wherein the power cord 24 is electrically connected to the power source 23. As seen in FIG. 2, FIG. 3 and FIG. 6, the power cord 24 extends out of the receptacle 1.

Continuing with the preferred embodiment, the present invention further comprises a speaker 25, and the speaker 25 is electronically connected to the microcontroller 7. This is so that the speaker 25 may provide audio for the advertisements being shown on the display device 5, or any other programmed commands.

In the preferred embodiment, the present invention comprises at least one access door 26. Preferably, the at least one access door 26 is laterally integrated onto the receptacle 1. Further, the at least one access door 26 is operably coupled to the receptacle 1, wherein operating the at least one access door 26 enables access to the cavity 2 within the receptacle 1. As seen in FIG. 1 and FIG. 4, the at least one access door 26 comprises a large access door 26*a* below the dispenser container enclosure compartment 3. The large access door 26*a* is an entry point on the front surface of the present invention and operates via a hinge mechanism. Further, the concentrate container 10 may be accessed or removed via the large access door 26*a*. Furthermore, the large access door 26*a* may be opened if maintenance or refilling of the concentrate container 10 is needed. In reference to FIG. 6, the at least one access door 26 comprises a small access door 26*b*. The small access door 26*b* can be opened for any necessary maintenance that may be needed for the components residing towards the top of the present invention.

As seen in FIG. 1 through FIG. 6, FIG. 8 and FIG. 9. the preferred embodiment comprises a sign board 27. Preferably, the sign board 27 is mounted onto a second surface 1*d* of the receptacle 1, wherein the second surface 1*d* is positioned adjacent to the first end 1*a* of the receptacle 1. In other words, a circular sign board is mounted onto the second surface 1*d*, which constitutes a top surface of the receptacle 1. However, the sign board 27 may comprise any other shape, size, location, orientation etc. as long as the intents of the present invention are not altered.

It is an objective of the present invention to enable both paid and unpaid versions for the service station. Accordingly, the present invention may comprise a payment system 28, wherein the payment system 28 is electronically connected to the microcontroller 7. For example, the payment system 28 may be a card reader, a scanner code, a number, or any other technology that is known to one of ordinary skill in the art, as long as the intents of the present invention are not altered.

To provide necessary illumination for guidance as well as decorative purposes, the present invention comprises at least one light source 29. Preferably, the light source 29 is electronically connected to the microcontroller 7 and the light source 29 is mounted onto the receptacle 1. However, the at least one light source 29 may comprise any color, power source, location etc. as long as the objectives of the present invention are fulfilled.

In summary, the windshield washer fluid dispenser self service station provides a method for dispensing windshield washer fluid into a vehicle for the purpose of cleaning the vehicle windshield. For the windshield washer fluid dispenser self service station to be utilized, a specific method must be performed. The electronic components of the present invention may be powered via a power source and the power cord extending from the back surface of the body of the present invention. The display device or tablet is activated automatically once the camera on the tablet captures motion and displays operating instructions and advertisements during the dispensing process. One may use a card reader to pay for the specific amount windshield washer fluid about to be used by tapping one's credit or debit card against the card reader. The present invention mixes highly concentrated windshield washer liquid from the container with water from the hose inlet water supply. The activation button may be pressed and held down to activate the blend center unit. The concentrate suction tube draws concentrate from the container, created as the water from the hose inlet water supply flows through the blend center unit and mixes with the water from the hose inlet water supply, by means of siphoning. The mixed product dispenser tube releases the mixed product through the opening of the dispenser container and fills the primary compartment of the dispenser container with the proper mixture. Depending on the amount of fluid dispensed into the dispenser container, one will be charged a specific amount of money to one's credit or debit card. Once the desired amount of fluid has been produced, one can relieve the activation button of pressure. The solenoid valve then closes, preventing fluid from entering the blend center unit and stopping the blend center unit from running. The dispenser container may then be picked up and removed from the dispenser container enclosure compartment via the handle. When one would like to dispense the fluid from the dispenser container, one can tilt the dispenser container at an angle so that fluid is spilled from the spout.

Although the invention has been explained in relation to its preferred embodiment, it is to be understood that many other possible modifications and variations can be made without departing from the spirit and scope of the invention as hereinafter claimed.

What is claimed is:

1. A windshield washer dispensing system comprising:

a receptacle;

a cavity;

a dispenser container enclosure compartment;

a dispenser container;

a user detecting device;

a display device;

a blend center unit;

an HID (human interface device);

a microcontroller;

the cavity traversing through the receptacle;

the cavity extending from a first end of the receptacle through a second end of the receptacle, wherein the first end is positioned opposite to the second end across the receptacle;

the dispenser container enclosure compartment, the HID, the display device, and the customer sensing device, being laterally integrated onto a first surface of the receptacle;

the dispenser container enclosure compartment extending into the cavity;

the dispenser container being detachably positioned within the dispenser container enclosure compartment;

the display device and the user detecting device being electronically coupled to the microcontroller;

the display device being operably coupled to the user detecting device, wherein the display device is actuated by the user detecting device;

the blend center unit being mounted adjacent to the HID; and the HID being operably coupled to the blend center unit, wherein operating the HID governs dispensing of a windshield washer solution from the blend center unit into the dispenser container.

2. The windshield washer dispensing system of claim 1, wherein the user detecting system is a camera.

3. The windshield washer dispensing system of claim 1, wherein the user detecting system is at least one sensor.

4. The windshield washer dispensing system of claim 1, comprising:

an electric casing;

a wireless communication module;

a power source;

the electric casing being mounted within the cavity;

the microcontroller, the wireless communication module, and the power source being mounted within the electric casing;

the wireless communication module being electronically connected to the microcontroller; and the power source being electrically connected to the microcontroller.

5. The windshield washer dispensing system of claim 1, comprising:

a speaker; and the speaker being electronically connected to the micro-controller.

6. The windshield washer dispensing system of claim 1, comprising:

at least one access door;

the at least one access door being laterally integrated onto the receptacle; and the at least one access door being operably coupled to the body, wherein operating the at least one access door enables access to the cavity within the receptacle.

7. The windshield washer dispensing system of claim 1, comprising:

a sign board;

the sign board being mounted onto a second surface of the receptacle; and the second surface being positioned adjacent to the first end of the receptacle.

8. The windshield washer dispensing system of claim 1, comprising:

a payment system; and the payment system being electronically connected to the microcontroller.

9. The windshield washer dispensing system of claim 1, comprising:

at least one light source;

the light source being electronically connected to the microcontroller; and the light source being mounted onto the receptacle.

10. The windshield washer dispensing system of claim 1, wherein the user detecting system is integrated into the display device.

11. The windshield washer dispensing system of claim 10, comprising:

a power cord;

the power cord being electrically connected to the power source; and the power cord extending out of the receptacle.

12. The windshield washer dispensing system of claim 1, comprising:

a concentrate container, a concentrate suction tube, a water supply tube, a mixed product dispenser tube;

the concentrate container, the concentrate suction tube, and the water supply tube being mounted within the cavity;

the concentrate container being mounted adjacent to the second end of the receptacle;

the concentrate suction tube being in fluid communication with the concentrate container and the blend center unit;

the blend center unit being in fluid communication with the concentrate suction tube and the water supply tube;

the mixed product dispenser tube extending from the blend center unit, wherein the mixed product dispenser tube is in fluid communication with the blend center; and the mixed product dispenser tube being oriented towards the dispenser container.

13. The windshield washer dispensing system of claim 12, the dispenser container comprising:

a container body;

an internal compartment;

a mouth;

a handle;

a spout;

the internal compartment traversing into the container body;

the mouth being oriented towards the mixed product dispenser tube;

the mouth providing access into the internal compartment;

the handle laterally mounted onto the container body;

the spout being laterally extending from the container body opposite to the handle; and the spout being in fluid communication with the internal compartment.

14. The windshield washer dispensing system of claim 12, comprising:

a water inlet valve;

an inlet water source;

the water inlet valve traversing laterally through the receptacle;

the water inlet valve being positioned adjacent to the second end of the receptacle; and the water supply tube being connected to the inlet water source through the water inlet valve.

15. A windshield washer dispensing system comprising:

a receptacle;

a cavity;

a dispenser container enclosure compartment;

a dispenser container;

a user detecting device;

a display device;

a blend center unit;

an HID (human interface device);

a microcontroller;

a concentrate container, a concentrate suction tube, a water supply tube, a mixed product dispenser tube;

the cavity traversing through the receptacle;

the cavity extending from a first end of the receptacle through a second end of the receptacle, wherein the first end is positioned opposite to the second end across the receptacle;

the dispenser container enclosure compartment, the HID, the display device, and the customer sensing device, being laterally integrated onto a first surface of the receptacle;

the dispenser container enclosure compartment extending into the cavity;

the dispenser container being detachably positioned within the dispenser container enclosure compartment;

the display device and the user detecting device being electronically coupled to the microcontroller;

the display device being operably coupled to the user detecting device, wherein the display device is actuated by the user detecting device;

the blend center unit being mounted adjacent to the HID;

the concentrate container, the concentrate suction tube, and the water supply tube being mounted within the cavity;

the concentrate container being mounted adjacent to the second end of the receptacle;

the concentrate suction tube being in fluid communication with the concentrate container and the blend center unit;

the blend center unit being in fluid communication with the concentrate suction tube and the water supply tube;

the mixed product dispenser tube extending from the blend center unit;

the mixed product dispenser tube being oriented towards the dispenser container; and the HID being operably coupled to the blend center unit, wherein operating the HID governs dispensing of a windshield washer solution from the blend center unit into the dispenser container.

16. The windshield washer dispensing system of claim 15, comprising:

a water inlet valve;

an inlet water source;

the water inlet valve traversing laterally through the receptacle;

the water inlet valve being positioned adjacent to the second end of the receptacle; and the water supply tube being connected to the inlet water source through the water inlet valve.

17. The windshield washer dispensing system of claim 15, comprising:

an electric casing;

a wireless communication module;

a power source;

the electric casing being mounted within the cavity;

the microcontroller, the wireless communication module, and the power source being mounted within the electric casing;

the wireless communication module being electronically connected to the microcontroller; and the power source being electrically connected to the microcontroller.

18. The windshield washer dispensing system of claim 15, comprising:

at least one access door;

the at least one access door being laterally integrated onto the receptacle; and the at least one access door being operably coupled to the body, wherein operating the at least one access door enables access to the cavity within the receptacle.

19. The windshield washer dispensing system of claim 15, comprising:

a sign board;

the sign board being mounted onto a second surface of the receptacle; and the second surface being positioned adjacent to the first end of the receptacle.

20. The windshield washer dispensing system of claim 15, wherein the user detecting system is integrated into the display device.

* * * * *